Patented Feb. 19, 1935

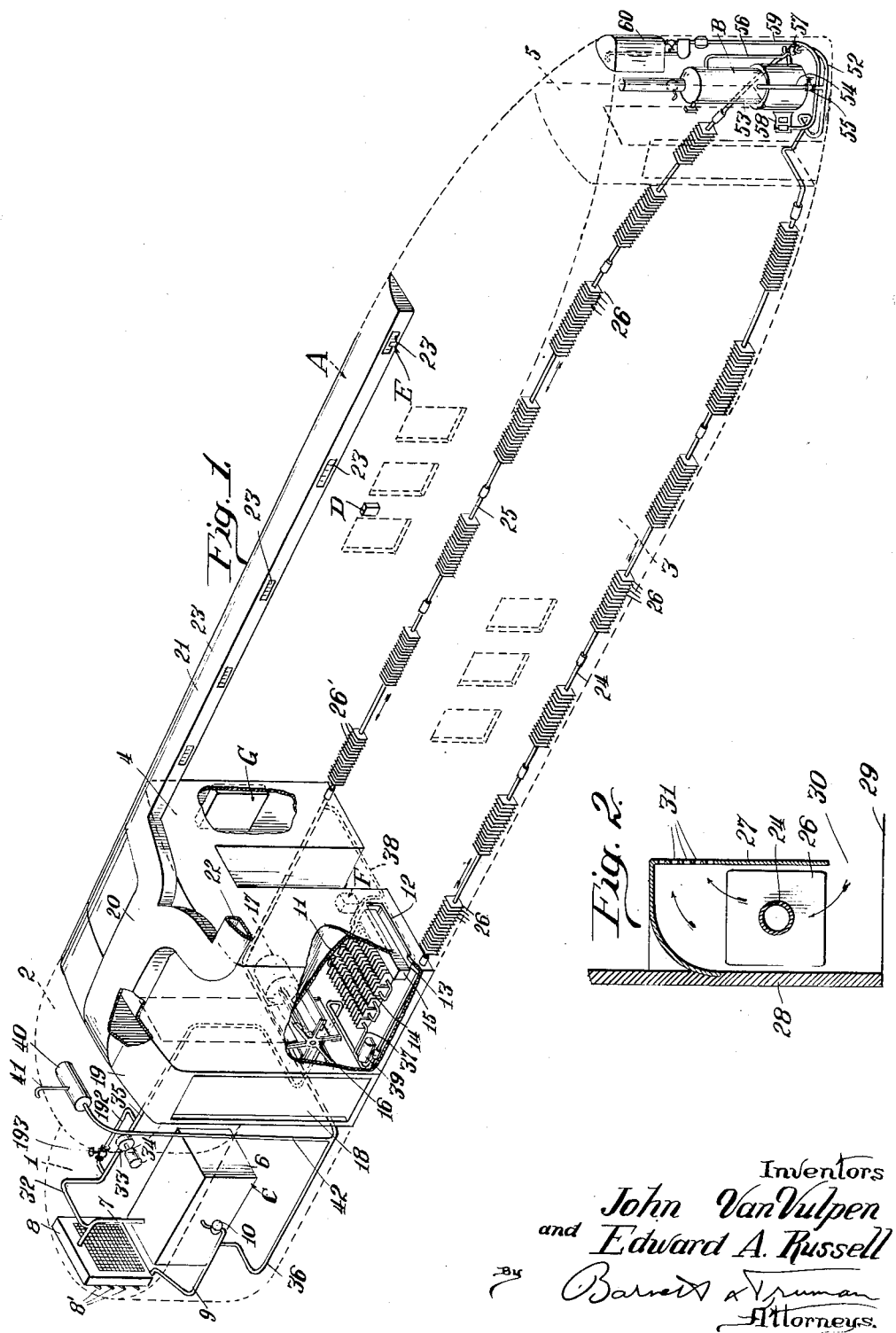

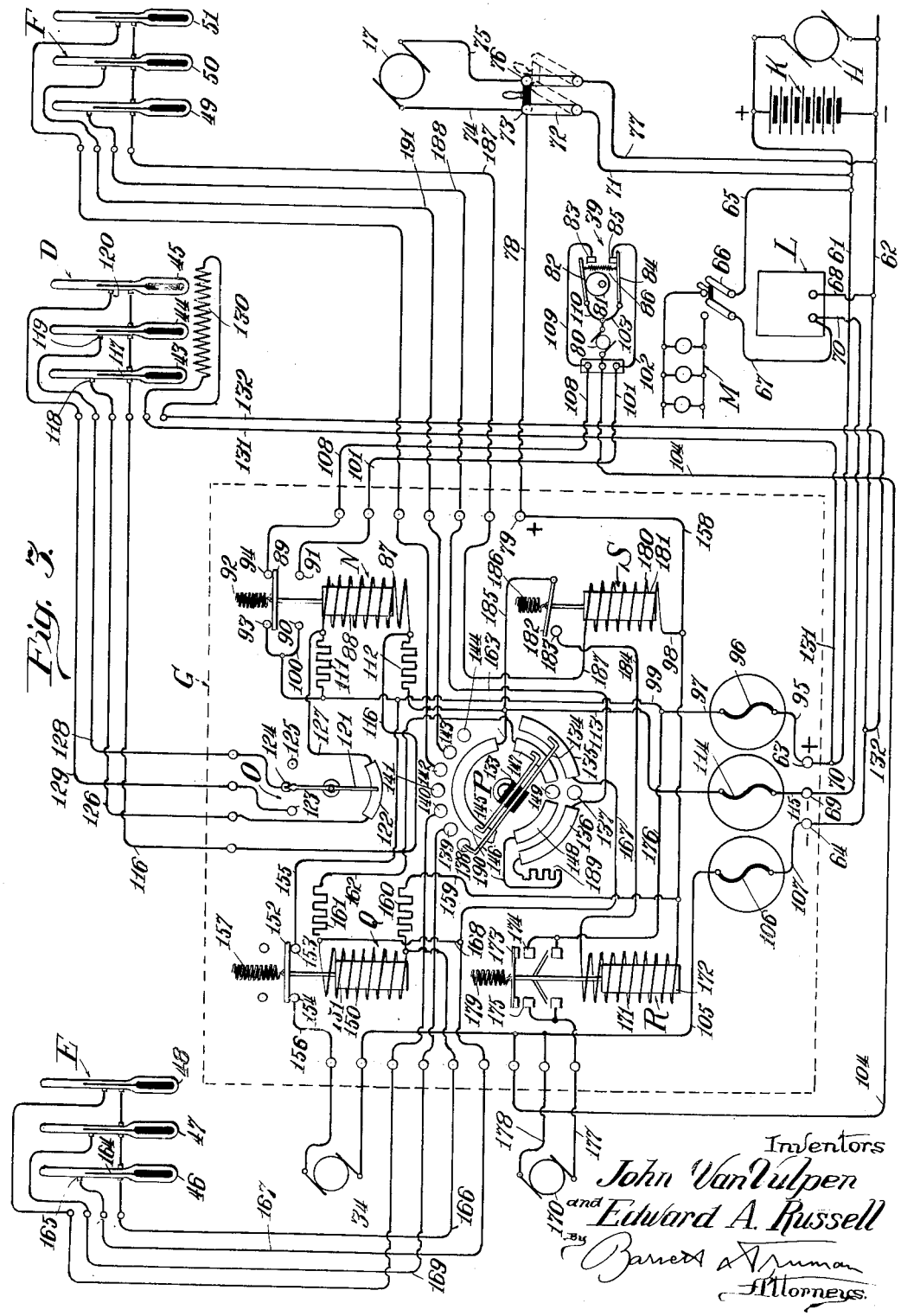

1,991,990

UNITED STATES PATENT OFFICE 1,991,990

HEATING SYSTEM FOR SELF-PROPELLED VEHICLES

John Van Vulpen and Edward A. Russell, Chicago, Ill., assignors to Vapor Car Heating Company, Inc., Chicago, Ill., a corporation of New York Application November 24, 1933, Serial No. 699,558

12 Claims. (Cl. 257—7)

This invention relates to certain new and useful improvements in a heating system for self-propelled vehicles, although some features of the invention are equally adaptable for use in temperature regulating systems for stationary enclosures.

Briefly described, the invention is primarily adapted for use in vehicles provided with an enclosed compartment or compartments, the vehicle being driven by an internal combustion engine which is provided with the usual cooling system consisting of an exposed radiator and means for circulating water from the engine jacket in which it is heated through the radiator in order to dissipate the heat, the water being then returned to the engine jacket. According to the present invention a portion or all of the engine-heated water may be diverted through a closed circulation system and used for heating the air within the closed compartments. The heated water is forced through this circulation system by a motor-driven pump which is thermostatically controlled, this pump when at rest being adapted to impede or stop the circulation of water through the circulating system. The vehicle is provided with a duct through which air from within the compartment (together with fresh air drawn in from outside the vehicle) is recirculated, and the temperature of the air regulated while passing through the duct. The looped circulation system for the engine-heated water is provided with two branch conduits arranged in parallel. In one of these branches is positioned a radiating device located within the duct so as to heat the re-circulated air. The other branch conduit passes through a plurality of radiating devices positioned directly within the car compartment. A thermostatically controlled motor-driven valve is positioned so as to control the flow of water through the last mentioned branch conduit. A refrigerating means is also positioned within the duct for cooling the re-circulated air when outside temperature conditions make this desirable. An auxiliary water-heating means is also provided for separately heating the circulated water when the engine is idle for long periods of time, or when the engine heat is inadequate for supplying the heating system. An electrical control system including the necessary thermostats is provided for automatically maintaining the selected temperatures within the vehicle compartments.

The principal object of this invention is to provide an improved temperature regulating system such as briefly described hereinabove and disclosed in detail in the specifications which follow.

Another object is to provide a heating system of this type in which the engine-heated water is positively forced through the heat-radiating system by means of a thermostatically controlled pump.

Another object is to provide a heating system of this type in which the heated water is separately circulated through radiating devices adapted to directly heat the air within the compartment and also air re-circulated from and back into the compartment, together with thermostatic mechanism for separately controlling the flow of the heating medium through these separate radiating devices.

Another object is to provide auxiliary means for heating the circulating water.

Another object is to provide, in connection with a heating system of this type, thermostatically controlled means for cooling the circulating air.

Another object is to provide an improved electrically operated thermostatically controlled system for automatically maintaining a predetermined temperature within the vehicle compartments.

Other objects and advantages of this invention will be more apparent from the following disclosure of one approved type of temperature-regulating system constructed and operated according to the principles of this invention.

In the accompanying drawings:

Fig. 1 is a perspective view, partly broken away and showing the vehicle outlines in phantom, illustrating the relative positioning of the principal elements of this temperature regulating system.

Fig. 2 is a detail sectional view through one portion of the radiating system within the vehicle compartment.

Fig. 3 is a wiring diagram illustrating one approved form of the electrical control system for the temperature-regulating apparatus.

Referring first to Figs. 1 and 2, at A is indicated in phantom outlines the body portion of a self-propelled passenger-carrying vehicle. The under-body or chassis of the vehicle is not indicated but may be of any usual and approved form. The vehicle body A comprises a forward compartment 1 in which the engine and associated mechanism are located, a driver's compartment 2, and a main passenger compartment 3. At the forward end of the main body portion, and intermediate the driver's compartment 2 and the passenger compartment 3, there may be divided off a compartment or series of compartments indicated generally at 4 in a portion of which many of the temperature regulating and controlling elements hereinafter described may be conveniently positioned. In the extreme rear end of the body A is a separate compartment 5 in which is located the auxiliary heater indicated generally at B, and hereinafter described more in detail.

In the forward compartment 1 is located the engine assembly indicated generally at C which furnishes the power for propelling the vehicle. This engine is of the internal combustion type and may be of any usual and approved construction, the principal elements of this assembly being here shown diagrammatically, as is true of many of the other features hereinafter referred to which may be of usual and well known construction. The main engine-block 6 is provided, as usual, with an engine jacket through which water is circulated to cool the engine, this water being forced out through pipe 7 into the radiator 8 where excess heat is dissipated. This radiator is preferably provided with thermostatically controlled shutters of well-known type, as indicated at 8'. The partially cooled water is returned from the radiator 8 through pipe 9 into the engine jacket, this circulation being positively maintained by means of the engine-driven pump 10.

The air re-circulating duct comprises a chamber 11, preferably located in a lower portion of the car compartment indicated generally at 4, this chamber being provided with a pair of inlet openings 12 and 13 communicating respectively with the space within passenger compartment 3 and the outside air. These inlets may be provided with adjustable shutters or similar valve mechanism for properly proportioning the relative amounts of fresh air drawn into the car and air which is re-circulated within the car compartments. Within the chamber 11 are located a radiator or equivalent heating element indicated at 14, and a mechanically operated refrigerating device indicated generally at 15. The fan or blower 16 driven by the electric motor 17 is adapted to draw air through the inlets 12 and 13 and over the heating and cooling elements 14 and 15 and force this air through the passages 18, 19 and 20 and thence through the branch passages 21 and 22 located in the upper corner portions of the car and each provided with a plurality of openings such as indicated at 23 through which the tempered air is discharged into the car compartment 3.

A direct heating system within the passenger compartment 3 comprises the opposite pipes or conduits 24 and 25 positioned adjacent the lower opposite sides of the car compartment and joined at the rear end of the car by the pipe loop 52. A plurality of spaced apart fins 26 are positioned on the pipes 24 and 25 throughout selected portions of their length so as to provide a plurality of heat transfer or radiating devices. As best shown in Fig. 2, these radiating devices are preferably housed within a shielding structure 27 which may be secured to the adjacent side wall 28 of the car, or form a portion thereof. This structure 27 encloses the top and front of the radiating devices but terminates short of the floor 29 of the car so as to provide an inlet passage 30 for the air within the compartment 3 which flows inwardly through this passage, thence upwardly in contact with the radiators, the heated air flowing out through the grilles or openings 31 in the upper portion of housing 27, all as indicated by the arrows in Fig. 2.

The radiating devices 14 and 26 are normally supplied with heated water from the engine jacket 6 through pipe 32 connected with the pipe 7 leading from the engine jacket to the radiator 8. The hot water is drawn from the engine jacket through pipes 7 and 32 by means of pump 33 driven by electric motor 34. The hot water is forced by pump 33 through pipe 35 which leads through suitable connections to the pipe or conduit 24, thence through pipe loop 52 and pipe 25 back through pipe 36 which connects into pipe 9 and thence returns the water into the engine jacket 6. A branch conduit 37 extends from pipe 24 to radiating device 14 and thence through pipe 38 into the return conduit 25. It will now be seen that the pump 33 serves to positively force the engine-heated water from the engine jacket through a closed circulation system and then back to the engine jacket, this circulation system comprising two parallel branches one of which includes the radiating device 14 in the air re-circulation duct, and the other of which includes the several radiating devices 26 within the passenger compartment 3. A motor-operated valve 39 is positioned in the supply conduit 24 just in advance of the branch conduit 37. When this valve 39 is open, the heated water will flow through both branch conduits so as to supply heat to all of the radiating devices. When valve 39 is closed the flow of water through the direct radiators 26 will be cut off, but the heated water will continue to flow through the radiator 14 which tempers the air drawn through the recirculation duct. Preferably the construction of pump 33 is such that when this pump is idle the flow of water through the entire heating system will be stopped or at least greatly impeded.

Preferably an expansion tank 40 is located in an upper portion of the car and provided with a suitable vent 41, the tank being connected through a pipe 42 with a portion of the circulating system, for example the pipe 36.

The motor-operated valve 39 is controlled by a thermostatic device D which may be positioned at a convenient location on the inner side wall of compartment 3 so as to register the temperature prevailing within the car compartment. This thermostatic device D may comprise a plurality of separate thermostats 43, 44 and 45 (see Fig. 3) which function to close separate control circuits at different selected temperatures, for example 74°, 71° and 50° Fahrenheit. Means, hereinafter described, may be provided to select which temperature shall be in control so as to determine the temperature that will be maintained within the car compartment. When this selected temperature is reached, the thermostatic device will operate to cause the motorized valve 39 to close so as to cut off the further flow of heated water through the radiating devices 26. The heated water however will continue to flow through the radiator 14 within the re-circulating air duct. The water re-circulating pump 33 is controlled by a second thermostatic device E which is so positioned as to be responsive to the temperature of the air stream discharged into the car through the air ducts 21 and 22. This thermostatic assembly E will be positioned in or on the face of one of these ducts, preferably over one of the outlet grilles 23. This thermostatic device E may be similar in construction to the device D, and may comprise high, medium and low temperature thermostats 46, 47 and 48, respectively, (see Fig. 3). These thermostats are preferably set to function at somewhat higher temperatures than the thermostats 43, 44 and 45, for example at 76°, 74° and 68° Fahrenheit, respectively. In other words, the temperature of the air discharged through ducts 21 and 22 into the car should be somewhat higher than the temperature that is to be maintained within the car compartment. When the temperature of this air stream exceeds the maximum for which the selected thermostat is set, this thermostat will function to stop the motor 34 which drives pump 33 thus cutting off the further flow of heated water through the circulation system. When this is done the radiating device 14 as well as the radiators 26 will cease to function, or the heating effect thereof will be greatly diminished.

A third thermostatic device F, which may be similar in construction to the thermostatic groups already described, controls the refrigerating apparatus 15. This thermostat F is preferably positioned within chamber 11 between the inlet openings 12 and 13 and the refrigerating device 15 so as to register the temperature of the air drawn into the re-circulation system. As will be hereinafter disclosed, the thermostatic assembly F and refrigerating apparatus 15 do not function while the heating system is in operation, and on the other hand none of the heating apparatus is operative when the refrigerating apparatus is functioning. The several relay devices through which the thermostats perform their controlling functions, and the devices for manually selecting the temperatures to be maintained are preferably grouped in a control panel or control box G which may be conveniently positioned somewhere within the compartment 4.

The auxiliary water heater B may be of any approved type, as here shown comprising the heating tank or equivalent device 53 into which leads the inlet pipe 54 extending from the pipe loop 52 of the circulation system. A cut-off valve 55 may be located in pipe 54. The outlet pipe 56 leads from heater 53 into the pipe loop 52, and a cut-off gate valve 57 is positioned in pipe 52 in advance of the connection with the outlet pipe 56. The water is heated by an oil burner indicated generally at 58, supplied with fuel through pipe 59 from the overhead tank 60. This auxiliary heater may be provided with any desired controls for maintaining the proper water temperature.

When this auxiliary heater B is not in use, the gate valve 57 will be open and the engine-heated water may circulate freely from pipe 24 through pipe loop 52 into pipe 27 without passing through the heating tank 53. In case the engine C is not in operation, or it is necessary to supply additional heat to the circulating water, the gate valve 57 is closed and valve 55 is open so that the heater 53 will be connected in the circulation loop. The water thus heated by the device will not only flow through the radiators 14 and 26, but also through engine jacket 6 so as to prevent freezing in the engine cooling system, and to facilitate the re-starting of the engine.

In Fig. 3 is indicated a wiring diagram of an improved form of electrical system for use on a vehicle of this type, showing how the several thermostatic mechanisms may be adjusted to maintain the desired temperatures and automatically control the several heating and cooling devices hereinabove described. The source of power comprises a generator H which is driven from the engine C, and the battery K which is charged by the generator. The positive and negative mains 61 and 62 respectively extend directly from the source of power to the terminals 63 and 64 on the control panel G. At L is indicated a maximum voltage regulator, which may be of well known type, this voltage regulator being connected as usual in the lighting circuit indicated generally at M. This lighting circuit extends from positive main 61 through wire 65, main lighting switch 66, the lighting circuits indicated generally at M, switch 66, wire 67, voltage regulator L and wire 68 to the negative main 62. The control circuits which pass through the several thermostats also include this maximum voltage regulator L, the return portion of these circuits extending from binding post 69 on the panel board through wire 70 to the voltage regulator, thence through wire 68 to the negative main 62.

The energizing circuit for motor 17 which drives the blower fan extends from positive main 61 through wire 71, fan-switch 72, terminal 73, wire 74, motor 17, wire 75, terminal 76, fan-switch 72, and wire 77 to the negative main 62. A positive wire 78 extends from switch terminal 73 to the positive terminal 79 on the panel board G. As will be hereinafter apparent, all of the control circuits for the heating and cooling mechanism within the air re-circulation duct extend through this wire 78 leading from the positive side of the blower-motor circuit, and these circuits will not be completed unless the fan switch 72 is closed. Therefore the temperature regulating devices within the duct are inoperative unless the blower is in operation.

The operating mechanism for the motorized valve 39 is indicated diagrammatically in Fig. 3. At 80 is indicated an electric motor which, when rotated for a predetermined length of time in one direction will, through suitable reduction gearing, close the valve. A further rotation in the same direction will open the valve. At 81 is indicated a cam which is connected with the valve operating mechanism so that when the valve is completely closed the cam will project upwardly as shown in Fig. 3 so as to move the pivoted contact arm 82 out of engagement with fixed contact 83. At this time an opposite pivoted contact arm 84 is held in engagement with a fixed contact 85 by means of the spring 86 which connects the two contact arms 82 and 84. When motor 80 has again been energized so as to move the valve to its open position, cam 81 will swing through an angle of 180° so as to move contact arm 84 out of engagement with fixed contact 85, at which time spring 86 will close a circuit between contact arm 82 and the fixed contact 83.

The relay N on the panel board comprises a solenoid coil 87 which, when energized, will draw down the core 88 so as to bring movable contact plate 89 into engagement with a pair of fixed contacts 90 and 91. When the coil 87 is de-energized (as shown in the drawings) the spring 92 will draw up the core and contact plate 89 so as to bridge the pair of fixed contacts 93 and 94. As shown in the drawings, the valve 39 is closed. Assuming now that coil 87 is energized, the movable contact plate 89 will be moved downwardly so as to bridge fixed contacts 90 and 91, and an energizing circuit for valve-operating motor 80 will be completed as follows: From positive terminal 63 (on the switch-board) through wire 95, fuse 96, wires 97, 99 and 100 to fixed contact 90, movable contact arm 89, fixed contact 91, wires 101 and 102 to fixed contact 85, pivoted contact arm 84, wire 103, motor 80, wires 104 and 105, fuse 106, and wire 107 to the negative terminal 64. Motor 80 will now rotate until the valve is opened, at which time cam 81 will move arm 84 out of engagement with fixed contact 85 and break the motor circuit. At this time the spring 86 will move contact arm 82 into engagement with fixed contact 83 so as to partially complete another motor-energizing circuit. This circuit will be completed when the relay coil 87 is again deenergized so as to permit contact plate 89 to bridge the fixed contacts 93 and 94. The motor energizing circuit will now extend as before through the movable contact plate 89, fixed contact 94, wires 108 and 109, fixed contact 83, movable contact 82, wire 110, motor 80, and as before to the negative terminal 64. Motor 80 will now operate until the switch has been closed, at which time cam 81 will lift the contact arm 82 and break the motor circuit. This is the position of parts shown in the drawings.

The coil 87 of relay N is normally energized through a circuit extending from positive terminal 63 through wire 95, fuse 96, wires 97, and 99, resistance 111, coil 87, resistance 112, wire 113, fuse 114 and wire 115 to the negative terminal 69. It will be noted that when coil 87 is energized, the valve 39 will be moved to open position. The thermostatic unit D is adapted to complete a shunt circuit for deenergizing the coil 87 when a certain temperature is reached in the car compartment 3, so that valve 39 will be automatically closed. The three mercury tube thermostats 43, 44 and 45 may be of similar construction, a wire 116 extending from one terminal of relay coil 37 to contacts which are in constant engagement with the mercury columns of all three thermostats. When a certain predetermined temperature is reached, for example 74° Fahrenheit, the mercury column 117 of the "high temperature thermostat" 43 will engage an upper fixed contact 118. At a somewhat lower temperature, for example 71° Fahrenheit, the mercury column of thermostat 44 will engage an upper contact 119. Thermostat 44 may be called the "medium temperature thermostat". At a still lower temperature, for example 50° Fahrenheit, the mercury column of thermostat 45 (the "low temperature thermostat") will engage a fixed contact 120. At O on the control panel G is indicated a manually operable selector switch for determining which of the three thermostats 43, 44 or 45 shall be in control of the motorized valve. This switch comprises a pivoted contact arm 121, the lower end of which is in constant engagement with arcuate contact plate 122, and the upper end of which may be moved selectively into engagement with any one of the three contacts 123, 124 or 125. The upper terminal 118 of thermostat 43 is connected through wire 126 with the fixed contact plate 122, from which wire 127 extends to the other terminal of solenoid coil 87. The upper terminal 119 of medium temperature thermostat 44 is connected through wire 128 with the fixed switch terminal 124. The upper terminal 120 of low temperature thermostat 45 is connected through wire 129 with the fixed switch terminal 123.

As shown in the drawings, the switch arm 121 has been moved into engagement with fixed contact 124 so that the medium temperature thermostat 44 will be in control of the valve, the valve being closed when a temperature of, for example, 71° Fahrenheit has been reached within the car, and the valve being opened again when the temperature within the car falls below this predetermined temperature. It will be noted that when this predetermined temperature is reached and the mercury column of thermostat 44 engages the upper thermostat terminal 119 a circuit for deenergizing relay coil 87 will be completed as follows: From the lower terminal of coil 87, through wire 116, thermostat 44, wire 128, switch terminal 124, switch arm 121, arcuate contact 122, and wire 127 to the other terminal of coil 87. This shunt circuit will deenergize the relay so that spring 92 will move contact plate 89 upwardly to complete the motor circuit for closing the valve 39. When the temperature within the car falls below this predetermined temperature, this shunt circuit through the thermostat will be broken and solenoid coil 87 will again be energized to complete a motor circuit for again opening the valve 39. When switch arm 121 is swung in a counter clockwise direction so as to engage the fixed contact 123, the low temperature thermostat 45 will be in control of the valve, the valve closing circuit being completed at a lower temperature. On the other hand, if switch arm 121 is swung in a clockwise direction into engagement with the contact 125, it will be apparent that neither of the circuits through thermostats 44 or 45 can be completed, and the valve will remain open until the shunt circuit has been completed through the high temperature thermostat 43.

At 130 is indicated a small heating coil which is energized through wires 131 and 132. This heating coil may be positioned adjacent the thermostats to adjust their operating temperatures or to compensate for a constant temperature variation in the vicinity of the thermostats.

At P is indicated a main control switch which is centrally positioned on the panel board G, and which determines whether the heating system or the cooling system shall be operated at any one time, and the temperature to be maintained thereby. This control member comprises a manually operable intermediately pivoted contact member 133. This member 133 comprises a long contact arm 134, the lower end of which engages alternatively with either one of a pair of arcuate contact plates 135 or 136, or an intermediate contact member 137. The upper end of arm 134 is adapted to engage alternatively with any one of a series of upper fixed contacts 138 to 144 inclusive. The switch arm 133 also includes a shorter pivoted contact arm 145 which is in constant engagement at its upper end with an arcuate contact plate 146, and which is adapted to engage at its lower end alternatively with either of a pair of arcuate contact plates 147 or 148, or with an intermediate contact 149. When the control arm 133 is swung to a vertical position so that the movable contact arms engage the unwired contact members 141, 149 and 137, neither the heating nor the cooling systems will be operative. When the arm 133 is swung in a counter clockwise direction (for example as shown in the drawings) the heating system will be operative. When the contact arm is swung in a clockwise direction to the other side of the vertical the refrigerating system will be operative but the heating system will be inoperative.

The relay Q comprises a solenoid coil 150 which, when energized, will draw down core 151 so as to bring contact plate 152 into engagement with fixed contacts 153 and 154 and complete a circuit for energizing the pump motor 34 as follows: From positive terminal 63 through wires 95, 97, 99 and 155 to fixed contact 153, movable contact 152, fixed contact 154, wire 156, pump motor 34, and wire 105 to the negative terminal 64. When the relay coil 150 is deenergized, the spring 157 will draw up contact plate 152 so as to break this circuit and stop the motor 34. The relay Q will normally be energized, whenever switch P is swung to any of its "heating" positions (that is in a counter clockwise direction from the vertical) through the following circuit: From positive terminal 79 trough wires 158 and 159, resistance 160, coil 150, resistance 161, wire 162, arcuate contact plate 147, switch arm 145, arcuate contact plate 146 and wires 163 and 113 to the negative terminal 69.

The thermostatic device E comprises a plurality of mercury tube thermostats 46, 47 and 48 which function in much the same manner as the thermostats of device D already described, so as to deenergize solenoid 150 and stop the pump motor 34 when a selected predetermined temperature has been reached at the location of the thermostatic device E. The thermostat which shall be in control of the pump is determined by the positioning of the control switch P. With the parts in the positions shown in Fig. 3, the high temperature thermostat 46 is in control but the desired temperature has not been reached and the pump motor 34 is in operation. When a certain predetermined temperature has been reached in the circulating air stream, the mercury column 164 of thermostat 46 will engage the upper fixed contact 165. A shunt circuit for deenergizing solenoid coil 150 will now be completed as follows: From one terminal of coil 150 through wire 166, thermostat 46, and wires 167 and 168 to the other terminal of coil 150. If switch P is adjusted so that contact arm 134 is in engagement with the upper fixed contact 139, the medium temperature thermostat 47 will be in control. When the somewhat lower predetermined temperature for which this thermostat is adjusted has been reached, a circuit for deenergizing coil 150 will be completed as follows: From one terminal of coil 150 through wire 166, thermostat 47, wire 169, fixed contact 139, switch arm 134, arcuate contact plate 135, and wires 167 and 168 to the other terminal of the coil 150. An exactly similar circuit will be completed at a lower predetermined temperature through thermostat 48 when switch P has been adjusted so that arm 134 is in engagement with upper fixed contact 140.

At 170 is indicated the motor for driving the mechanical refrigerating apparatus indicated at 15 in Fig. 1. At R is indicated a relay comprising a coil 171 which, when energized, will draw down the core 172 and bring contact plate 173 into engagement with fixed contacts 174 and 175 thus completing an energizing circuit for motor 170 as follows: From positive terminal 63 through wires 95, 97 and 176, contacts 174, 173 and 175, wire 177, motor 170, and wires 178 and 105 to the negative terminal 64. Since a rather heavy current is sometimes necessary for operating the refrigerating apparatus, the circuit closure operated by relay R has been illustrated as of the double-pole type so as to facilitate the making and breaking of this circuit. When the coil 171 is deenergized, the coil 172 and contact plates will be drawn upwardly by spring 179 so as to break the motor circuit.

At S is indicated a relay comprising a coil 180 which, when energized, will draw down core 181 thus moving contact plate 182 into engagement with a fixed contact 183. This will complete an energizing circuit for coil 171 of relay R as follows: From positive terminal 79 through wire 158, coil 171, wire 184, fixed contact 183, movable contact 182, and wires 185, 113 and 115 to the negative terminal 69. When relay S is deenergized, the spring 186 will lift the contact arm 182 so as to break this circuit and deenergize the relay R.

The thermostatic group F which controls the cooling apparatus may be of substantially the same form as the thermostatic devices D and E already described. Assuming that the switch P has been set so that the upper end of contact arm 134 is in engagement with the contact 144, the high temperature thermostat 49 will be in control of the cooling system. When the temperature in the re-circulating air duct has risen to the temperature for which thermostat 49 is adjusted, an energizing circuit for relay S will be completed as follows: From positive terminal 79 through wires 158 and 98, solenoid coil 180, wire 187, thermostat 49, wire 188, arcuate contact 136, resistance 189 and wire 190 to arcuate contact 148, contact arm 145, arcuate contact 146, and wires 163, 113 and 115 to negative terminal 69. This will energize the relay S so as to complete the circuit for energizing the relay R which in turn will start the refrigerating motor 170 into operation. When the temperature of the circulating air stream has been lowered sufficiently the last described circuit will be broken through thermostat 49 and relay S will be deenergized so as to deenergize relay R and stop the refrigerating mechanism.

If switch arm P is moved to such a position that the upper end of arm 134 is in engagement with fixed contact 143, the medium temperature thermostat 50 will be in charge of the system so as to maintain the temperature of the circulating air stream at a somewhat lower temperature. Under these conditions the energizing circuit for relay S will extend as before through wire 187 to thermostat 50, wire 191, fixed contact 143, switch arm 134, to arcuate contact 136 and thence as before to the negative terminal 69. An exactly similar control circuit will be established through low temperature thermostat 51 when the arm 134 of switch P is moved into engagement with fixed contact 142.

While one complete electrical control system for the heating and cooling mechanism has been hereinabove disclosed by way of example, it will be understood that the heating and refrigerating mechanism first described which constitutes the particular subject matter of this invention, might be automatically controlled by other means without departing from the principles of this invention.

It will now be noted that so long as the engine C is in operation, the hot water for circulating through the heating system may be heated by the engine, although this same circulating air stream may be heated by the auxiliary heater B. The pump 33 which propels the water through this circulating system will not be operative unless the blower 16 which enforces the air circulation is operative. When a certain predetermined temperature is reached in this circulating air stream, the pump motor 34 will be stopped so as to stop the circulation of the hot water. The radiators 26 which directly heat the air within the car compartment 3 are controlled by a separate thermostatic device so that the circulation of the heated water through these last mentioned radiators will be stopped independently of the circulation through the radiator 14 which heats the circulating air stream. When a certain temperature has been established within the compartment, sufficient additional heat to keep up this temperature may be furnished from the heated air stream and at such times the direct radiators 26 may be cut out of service by closing the motorized valve 39.

A by-pass pipe 192 provided with a manually operable gate-valve 193 is connected at its ends to conduit 32 at opposite sides of the pump 33. Valve 193 is normally closed, but by opening this valve the water may be permitted to circulate through the heating conduits when pump 33 is not operating. When the car is lying idle and the water is being heated by the auxiliary heater B, it may not be desirable to keep the pump 33 in operation. At such times the valve 193 may be opened to permit a thermo-siphon circulation of the heated water.

In warm weather when heat is not required, the pump 33 will not be operated and the only circulation of the heated water from the engine jacket will be through the radiator 8 from which the heat is dissipated. At such times, the refrigerating apparatus 15 may be operated and the cooled air circulated through compartment 3 by means of the blower 16.

We claim:

1. In combination with a compartment to be heated and a source of heated water, means for circulating air within the compartment comprising a duct having an inlet and an outlet and means for propelling air through the duct, and means for heating the compartment comprising a radiating device within the duct, radiating devices within the compartment, and a closed water-circulating system including the source of heated water and having two parallel branch conduits one of which includes the radiating device within the duct and the other of which includes the radiating devices within the compartment, a motor-driven pump for positively propelling water through the circulation system or cutting off the flow of water therethrough, a thermostatically controlled valve for cutting off the flow of water through the branch conduit which includes the radiating devices within the compartment, and thermostatically operated mechanism for closing the valve when one predetermined temperature is reached in the compartment, and for stopping the motor-driven pump when a predetermined higher temperature is reached in the compartment.

2. In combination with a vehicle comprising an enclosed body compartment and propelling means for the vehicle including an internal combustion engine and a cooling system for the engine comprising the engine jacket, a radiator and means for circulating water through the engine jacket and radiator, means for circulating air within the compartment comprising a duct having an inlet and an outlet, and means for propelling air through the duct, and means for heating the compartment comprising a radiating device within the duct, radiating devices within the compartment, and a closed water-circulating system connected in shunt with a portion of the engine-cooling system and including the engine-jacket, said circulation system including two parallel branch conduits one of which includes the radiating device within the duct and the other of which includes the radiating devices within the compartment, and a thermostatically-operated valve for cutting off the flow of heated water through the last-mentioned conduit.

3. In combination with a vehicle comprising an enclosed body compartment and propelling means for the vehicle including an internal combustion engine and a cooling system for the engine comprising the engine jacket, a radiator and means for circulating water through the engine jacket and radiator, means for circulating air within the compartment comprising a duct having an inlet and an outlet, and means for propelling air through the duct, and means for heating the compartment comprising a radiating device within the duct, radiating devices within the compartment, and a closed water circulating system connected in shunt with a portion of the engine-cooling system and including the engine-jacket, said circulation system including two parallel branch conduits one of which includes the radiating device within the duct and the other of which includes the radiating devices within the compartment, and a thermostatically-operated valve for cutting off the flow of heated water through one of the branch conduits.

4. In combination with a vehicle comprising an enclosed body compartment and propelling means for the vehicle including an internal combustion engine and a cooling system for the engine comprising the engine jacket, a radiator and means for circulating water through the engine jacket and radiator, means for circulating air within the compartment comprising a duct having an inlet and an outlet, and means for propelling air through the duct, and means for heating the compartment comprising a radiating device within the duct, radiating devices within the compartment, and a closed water-circulating system connected in shunt with a portion of the engine-cooling system and including the engine-jacket, said circulation system including two parallel branch conduits one of which includes the radiating device within the duct and the other of which includes the radiating devices within the compartment, a motor-driven valve for cutting on or off the flow of water through the last-mentioned conduit, and thermostatic means for controlling the operation of the valve.

5. In combination with a vehicle comprising an enclosed body compartment and propelling means for the vehicle including an internal combustion engine and a cooling system for the engine comprising the engine jacket, a radiator and means for circulating water through the engine jacket and radiator, means for circulating air within the compartment comprising a duct having an inlet and an outlet, and means for propelling air through the duct, and means for heating the compartment comprising a radiating device within the duct, radiating devices within the compartment, and a closed water-circulating system connected in shunt with a portion of the engine-cooling system and including the engine-jacket, an auxiliary device for heating the water adapted to be connected in the closed circulation system, said circulation system including two parallel branch conduits one of which includes the radiating device within the duct and the other of which includes the radiating devices within the compartment, and a thermostatically-operated valve for cutting off the flow of heated water through the last-mentioned conduit.

6. In combination with a vehicle comprising an enclosed body compartment and propelling means for the vehicle including an internal combustion engine and a cooling system for the engine comprising the engine-jacket, a radiator and means for circulating water through the engine jacket and radiator, means for circulating air within the compartment comprising a duct having an inlet and an outlet, and means for propelling air through the duct, and means for heating the compartment comprising a radiating device within the duct, radiating devices within the compartment, and a closed water circulating system connected in shunt with a portion of the engine-cooling system and including the engine jacket, said circulation system including two parallel branch conduits one of which includes the radiating device within the duct and the other of which includes the radiating devices within the compartment, a motor-driven pump for positively propelling water through the circulation system or cutting off the flow of water therethrough, thermostatic means for controlling the operation of the pump, and a thermostatically controlled valve for cutting off the flow of water through the branch conduit which includes the radiating devices within the compartment.

7. In combination with a vehicle comprising an enclosed body compartment and propelling means for the vehicle including an internal combustion engine and a cooling system for the engine comprising the engine jacket, a radiator and means for circulating water through the engine jacket and radiator, means for circulating air within the compartment comprising a duct having an inlet and an outlet, and means for propelling air through the duct, and means for heating the compartment comprising a radiating device within the duct, radiating devices within the compartment, and a closed water circulating system connected in shunt with a portion of the engine-cooling system and including the engine jacket, said circulation system including two parallel branch conduits one of which includes the radiating device within the duct and the other of which includes the radiating devices within the compartment, a motor-driven pump for positively propelling water through the circulation system or cutting off the flow of water therethrough, thermostatic means for controlling the operation of the pump, and a thermostatically controlled valve for cutting off the flow of water through one of the branch conduits.

8. In combination with a vehicle comprising an enclosed body compartment and propelling means for the vehicle including an internal combustion engine and a cooling system for the engine comprising the engine jacket, a radiator and means for circulating water through the engine jacket and radiator, means for circulating air within the compartment comprising a duct having an inlet and an outlet, and means for propelling air through the duct, and means for heating the compartment comprising a radiating device within the duct, radiating devices within the compartment, and a closed water circulating system connected in shunt with a portion of the engine-cooling system and including the engine jacket, said circulation system including two parallel branch conduits one of which includes the radiating device within the duct and the other of which includes the radiating devices within the compartment, a motor-driven pump for positively propelling water through the circulation system or cutting off the flow of water therethrough, thermostatic means for controlling the operation of the pump, a motor-driven valve for cutting off or on the flow of water through the branch conduit which includes the radiating devices within the compartment, and thermostatic means for controlling the valve.

9. In combination with a vehicle comprising an enclosed body compartment and propelling means for the vehicle including an internal combustion engine and a cooling system for the engine comprising the engine jacket, a radiator and means for circulating water through the engine jacket and radiator, means for circulating air within the compartment comprising a duct having an inlet and an outlet, and means for propelling air through the duct, and means for heating the compartment comprising a radiating device within the duct, radiating devices within the compartment, and a closed water circulating system connected in shunt with a portion of the engine-cooling system and including the engine jacket, said circulation system including two parallel branch conduits one of which includes the radiating device within the duct and the other of which includes the radiating devices within the compartment, a motor-driven pump for positively propelling water through the circulation system or cutting off the flow of water therethrough, thermostatic means for controlling the operation of the pump, a thermostatically controlled valve for cutting off the flow of water through the branch conduit which includes the radiating devices within the compartment, and an auxiliary device for heating the water adapted to be connected in the closed circulation system.

10. In combination with a vehicle comprising a closed body compartment and propelling means for the vehicle including an internal combustion engine and a cooling system for the engine comprising a closed conduit system in which are connected in series the engine jacket, a radiator and means for circulating water through the closed conduit system, means for heating the compartment comprising a second closed water circulation system including radiating devices for transferring heat to the compartment, said second circulating system being connected in shunt with a portion of the engine cooling system so as to include the engine jacket, and a motor-driven pump positioned in that portion of the second circulation system which is distinct from the cooling system for positively propelling water from the engine jacket through the second circulation system, or cutting off the circulation of water therethrough without stopping the circulation of water through the cooling system.

11. In combination with a vehicle comprising a closed body compartment and propelling means for the vehicle including an internal combustion engine and a cooling system for the engine comprising a closed conduit system in which are connected in series the engine jacket, a radiator and means for circulating water through the closed conduit system, means for heating the compartment comprising a second closed water circulation system including radiating devices for transferring heat to the compartment, said second circulating system being connected in shunt with a portion of the engine cooling system so as to include the engine jacket, and a motor-driven pump positioned in that portion of the second circulation system which is distinct from the cooling system for positively propelling water from the engine jacket through the second circulation system, or cutting off the circulation of water therethrough without stopping the circulation of water through the cooling system, and thermostatic means for controlling the operation of the motor-driven pump.

12. In combination with a vehicle comprising a closed body compartment and propelling means for the vehicle including an internal combustion engine and a cooling system for the engine comprising a closed conduit system in which are connected in series the engine jacket, a radiator and means for circulating water through the closed conduit system, means for heating the compartment comprising a second closed water circulation system including radiating devices for transferring heat to the compartment, said second circulating system being connected in shunt with a portion of the engine cooling system so as to include the engine jacket, and a motor-driven pump positioned in that portion of the second circulation system which is distinct from the cooling system for positively propelling water from the engine jacket through the second circulation system, or cutting off the circulation of water therethrough without stopping the circulation of water through the cooling system, an auxiliary heating device, and valved conduit connections adapted to connect this device in the second circulation system.

JOHN VAN VULPEN.
EDWARD A. RUSSELL.